H. MAYER & G. SCHLATTER.
FASTENING DEVICE FOR ANTISKIDDING MEANS.
APPLICATION FILED JUNE 5, 1917.

1,246,132.

Patented Nov. 13, 1917.
2 SHEETS—SHEET 1.

Inventors
Heinrich Mayer
and Gustav Schlatter
by Redding, Greeley & Woodlett
Attys

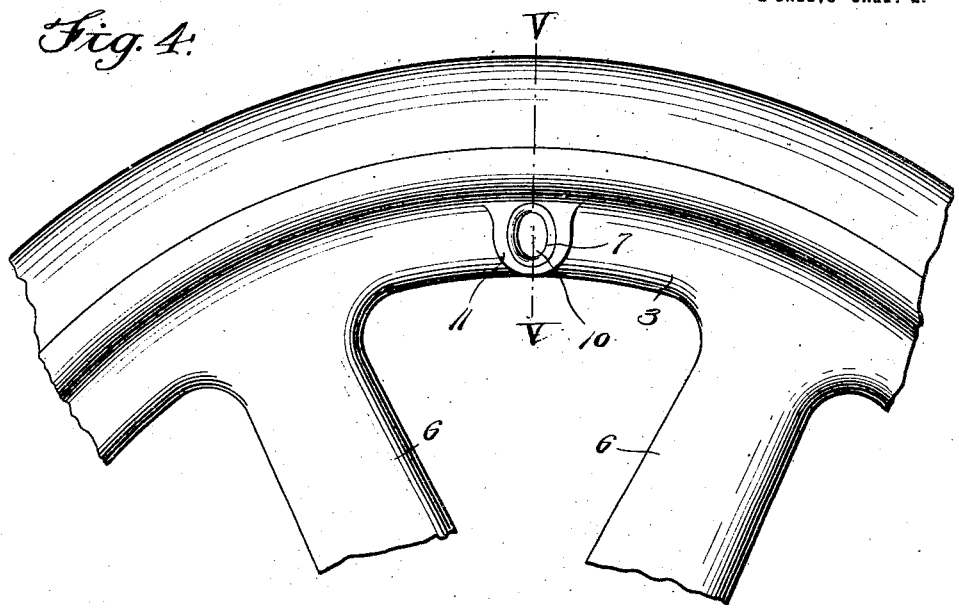
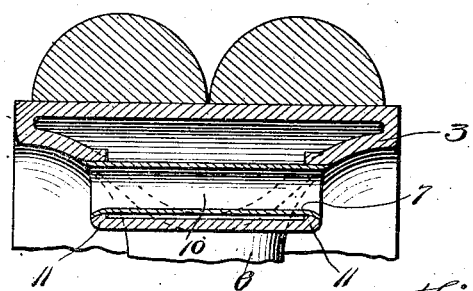
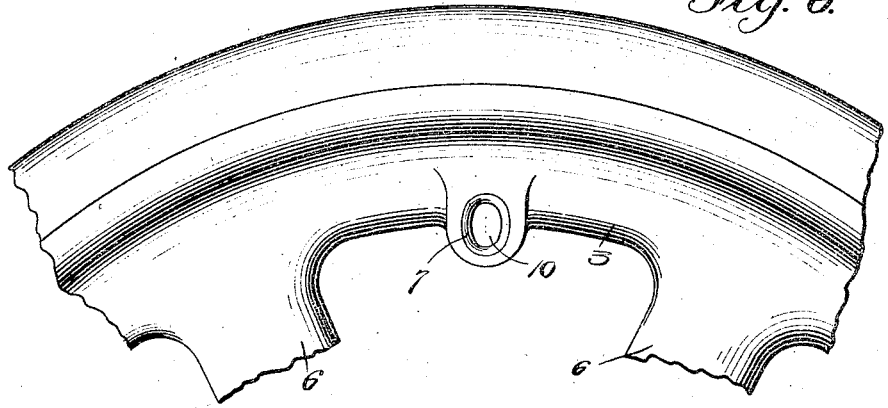

UNITED STATES PATENT OFFICE.

HEINRICH MAYER, OF ARBON, AND GUSTAV SCHLATTER, OF STEINACH, SWITZERLAND, ASSIGNORS TO FIRMA ADOLPH SAURER, OF ARBON, SWITZERLAND.

FASTENING DEVICE FOR ANTISKIDDING MEANS.

1,246,132. Specification of Letters Patent. Patented Nov. 13, 1917.

Application filed June 5, 1917. Serial No. 172,950.

*To all whom it may concern:*

Be it known that we, HEINRICH MAYER, a subject of the Emperor of Germany, residing at Arbon, Switzerland, and GUSTAV SCHLATTER, a citizen of the Republic of Switzerland, residing at Steinach, Switzerland, have invented certain new and useful Improvements in Fastening Devices for Antiskidding Means; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to anti-skidding means for vehicle-wheels and it has for its object to provide a device for securing in a detachable manner antiskidding means to such wheels and particularly to metal wheels.

Compared with known fastening devices of this kind, the device according to this invention is characterized in that the fastening or fixing of the antiskidding chain is effected without the use of any special fastening means difficult to manufacture and therefore usually expensive. A further advantage of the fastening device according to this invention consists in that it increases only to a small degree the weight of the wheel and that the chain is prevented from exerting any detrimental stresses upon the wheel, when the latter is moved.

According to this invention the end-member of the antiskidding chain has the shape of an elongated fastening loop or link, which is inserted into a correspondingly shaped slot of the wheel. This slot may be provided in the felly or in that part of the felly which forms a web or connection between two spokes, the fastening loop being then fixed in the proper position on one end by a link connecting it to the antiskidding chain and on the other end by a chain-hook coöperating with this end. The link thus forms a rigid bar which passes through the felly and gives a fixed anchorage for the ends of the chain.

This invention will now be more particularly described with reference to the accompanying drawings, which illustrate several constructional examples of the invention.

Figure 1:
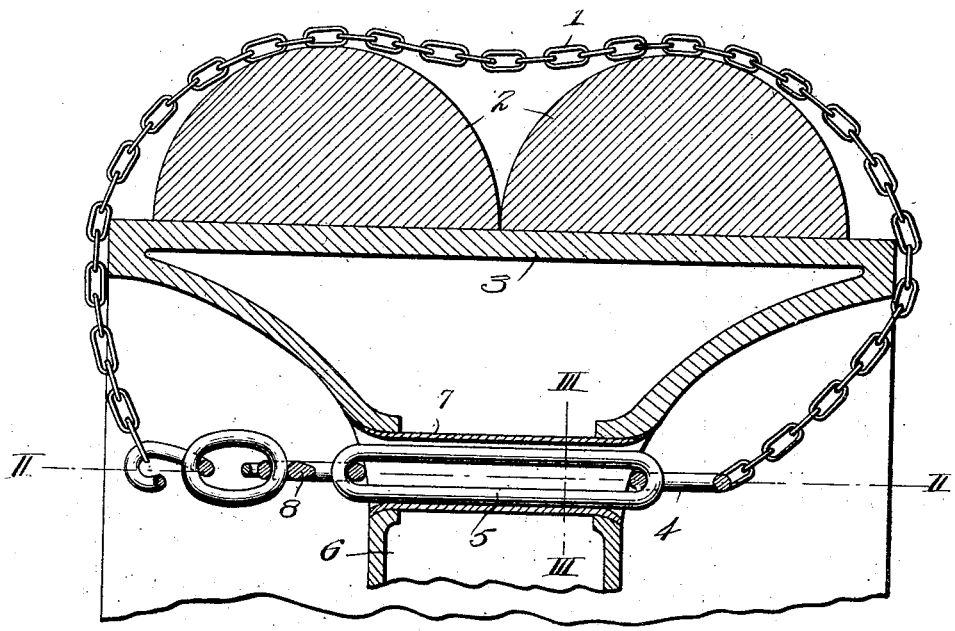
Figure 3:
Figure 2:
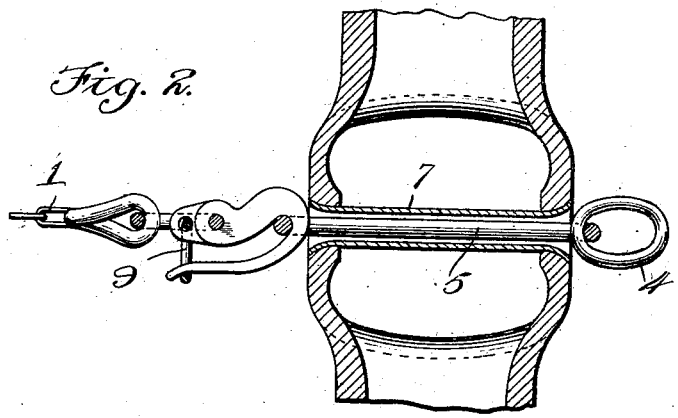

In these drawings:

Figures 1 to 3 show one embodiment,

Fig. 1 being a radial section through the felly and the adjoining parts of a wheel;

Fig. 2 a cross-section on the line II—II of Fig. 1, and

Fig. 3 a cross-section on the line III—III of Fig. 1;

Fig. 4 is a view in elevation of a part of a wheel, showing another arrangement of the slot, Fig. 5 is a section on the line V—V of Fig. 4, and Fig. 6 is a view in elevation of a part of a wheel, showing still another arrangement of the slot.

In the embodiment shown in Figs. 1 to 3 the antiskidding chain 1 passes over the wheel tire 2 and the felly 3 of a metal wheel, the upper part of which is shown in Fig. 1. The end-member of the chain 1 has the shape of an elongated fastening loop or link 5, which is inserted in a slot provided in a part of the wheel forming a bridge between the felly 3 and a spoke 6. This slot is preferably lined with a sleeve 7. The loop 5 is secured in this position in the slot on the one side by means of the shackle 4 connecting it to the chain and on the other side by means of the fastening hook 8 coöperating with the opposite end of loop or link 5. Hook 8 is provided with a safety shackle 9. It is evident that the chain-shackle 4 must be larger than the cross-section of said slot so that it cannot be drawn through. There is no detrimental weakening of the metal wheel owing to the provision of the slot in the web portions between the spokes, as sufficient material is provided by the turning over or thickening of the metal around the openings.

As shown in Figs. 4 and 5 the slot 10, adapted to receive the sleeve 7 and the fastening loop or link 5, may be formed in that portion of the felly 3, which lies between two spokes 6. In this case a flange 11 is formed at each end of the slot.

In the construction shown in Fig. 6 the hole 10 is arranged nearer the center of the wheel than in the embodiment shown in Figs. 4 and 5, so that a part of the wall of the slot projects from the inner edge of the felly toward the axis of the wall.

It is to be understood that changes in details of construction within the scope of the claims may be made to suit the convenience of the manufacturer and the requirements of use.

What we claim is:

1. A device for securing in a detachable manner antiskidding means to a wheel, comprising an elongated loop adapted to be inserted in a slot provided in the felly of the wheel, a member connecting said loop at one end to the antiskidding means and a hook at the other end of the antiskidding means and coöperating with said loop.

2. A device for securing in a detachable manner antiskidding means to a wheel, comprising an elongated loop adapted to be inserted in a slot provided in the felly, a member connecting said loop at one end to the antiskidding means and a hook at the other end of the antiskidding means and coöperating with said loop, the latter being secured in said slot on one side by means of said member and on the other side by means of the hook.

3. A device for securing in a detachable manner an antiskidding chain to a wheel, comprising an elongated loop adapted to be inserted in a slot provided in the felly, a sleeve inserted in said slot, an anti-skidding chain, a shackle connecting said loop to the antiskidding chain and a hook at the other end of the antiskidding chain and coöperating with said loop.

4. A device for securing in a detachable manner anti-skidding means to a wheel, comprising a rigid link adapted to be inserted in a slot provided in the felly of the wheel, anti-skidding means connected to said link at one end, and a detachable device at the other end of the anti-skidding means and coöperating with said link.

In testimony that we claim the foregoing as our invention, we have signed our names.

HEINRICH MAYER.
GUSTAV SCHLATTER.

Copies of this patent may be obtained for five cents each, by addressing the "Commissioner of Patents, Washington, D. C."